United States Patent

Neeff, deceased et al.

[11] Patent Number: 4,721,745
[45] Date of Patent: Jan. 26, 1988

[54] PIGMENTS BASED ON METAL COMPLEXES

[75] Inventors: Rütger Neeff, deceased, late of Leverkusen, by Käte Neeff, heiress; Meinhard Rolf; Walter Müller, both of Leverkusen, all of Fed. Rep. of Germany

[73] Assignee: Bayer Aktiengesellschaft, Leverkusen, Fed. Rep. of Germany

[21] Appl. No.: 919,092

[22] Filed: Oct. 15, 1986

[30] Foreign Application Priority Data

Oct. 23, 1985 [DE] Fed. Rep. of Germany ....... 3537625

[51] Int. Cl.$^4$ ........................ C08K 5/34; C09D 5/00
[52] U.S. Cl. ................... 524/94; 544/225; 548/105; 548/403
[58] Field of Search ................ 524/94; 548/403, 105; 544/225

[56] References Cited

U.S. PATENT DOCUMENTS 4,614,547  9/1986  Neeff et al. .................. 548/105

FOREIGN PATENT DOCUMENTS 3338622  5/1985  Fed. Rep. of Germany ...... 548/403

Primary Examiner—John C. Bleutge
Assistant Examiner—David W. Woodward
Attorney, Agent, or Firm—Sprung Horn Kramer & Woods

[57] ABSTRACT

Pigments of the formula

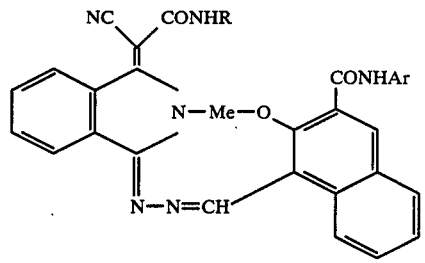

in which
Me=Zn, Cu, Co or preferably Ni,
R=alkyl, cycloalkyl, aralkyl, aryl and hetaryl, where the mentioned radicals can be substituted, and
Ar=optionally substituted aryl,
processes for their preparation, and their use.

10 Claims, No Drawings

PIGMENTS BASED ON METAL COMPLEXES

The invention relates to pigments based on metal complexes of the formula

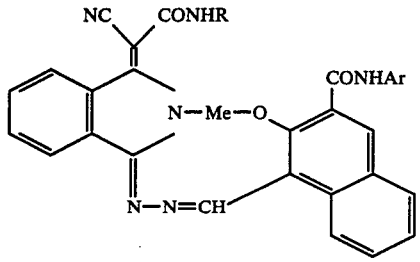

in which
Me=Zn, Cu, Co or preferably Ni,
R=alkyl, cycloalkyl, aralkyl, aryl and hetaryl, where the mentioned radicals can be substituted, and
Ar=optionally substituted aryl.

Alkyl (R) preferably represents $C_1$–$C_6$-alkyl, for example —$CH_3$, —$C_2H_5$, —$C_3H_7$ or —$C_4H_9$.

Cycloalkyl (R) preferably represents $C_3$–$C_7$-cycloalkyl, for example cyclopentyl and cyclohexyl.

Aralkyl (R) preferably represents phenyl- and naphthyl-$C_1$–$C_4$-alkyl, for example benzyl. Aryl (R, Ar) preferably represents phenyl and naphthyl.

Hetaryl (R) preferably represents benzimidazol-2-yl and benzthiazol-2-yl and 4-quinazolon-2-yl.

The abovementioned aryl and aralkyl radicals (in the aryl part) can be substituted by, for example, halogen, such as Cl, Br or F, —$NO_2$, —CN, —$CF_3$, $C_1$–$C_4$-alkyl, in particular methyl and ethyl, $C_1$–$C_4$-alkoxy, in particular methoxy and ethoy, carbamoyl, mono- and di-$C_1$–$C_4$-alkyl-carbamoyl or $C_1$–$C_4$-alkylamino, in particular acetylamino.

Preferred radicals Ar are: phenyl, α-naphthyl, 2-methylphenyl, 4-methylphenyl, 3-nitrophenyl, 2-5-dimethoxy-4-chlorophenyl, 2,5-dimethoxyphenyl, 4-chlorophenyl, 2,4-dimethoxy-5-chlorophenyl, 2-methyl-5-chlorophenyl, 2-methoxyphenyl, 2,4-dimethylphenyl, 2-ethoxyphenyl, 2-methyl-4-chlorophenyl and 4-acetylaminophenyl.

The pigments according to the invention are prepared, for example, by reaction of isoindole hydrazones of the formula

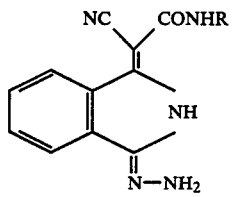

in which R has the meaning indicated for formula I, with β-oxynaphthoic acid derivatives of the formula

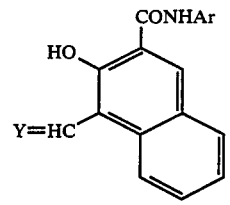

in which Y represents O or N—Ph, Ph designating optionally substituted phenyl and Ar having the meaning indicated for formula I, to give ligands of the formula

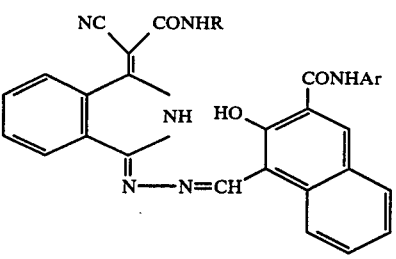

which, if appropriate after isolation, are reacted with a compound $MeX_2$ (Me=Zn, Cu, Co, Ni; X or $X_2$ preferably=acetate, formate, chloride or sulphate).

Alternatively, the reaction of II with III can be carried out in the presence of $MeX_2$, the pigments I then being formed directly.

Furthermore, the pigments I are accessible by, for example, reaction of the isoindole

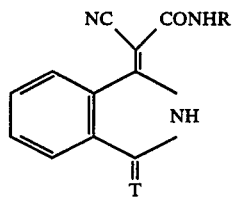

in which T represents O, NH or NZ, where Z designates optionally substituted phenyl, and R has the formula indicated for formula I, with the hydrazone

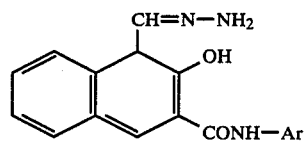

in which Ar has the meaning indicated for formula I, with subsequent or simultaneous metallization.

The reactions proceed in organic solvents, for example dimethylformamide, n-butanol, glycol monomethyl ether, preferably at temperatures between 50° and 150° C.

Some of the pigments I occur in several modifications which can be obtained by subsequent heating at elevated temperaturres or by finishing processes.

Because of their good pigment properties, the pigments of the formula I are suitable for a wide variety of pigment applications. Thus, they can be used for the preparation of very fast pigmented systems, such as mixtures with other substances, preparations, paints, printing inks, coloured paper and coloured macromolecular substances. Mixtures with other substances can be understood, for example, as those with inorganic white pigments such as titanium dioxide (rutile). Preparations are, for example, flushing pastes with organic liquids and, if appropriate, preservatives. The designation paints represents, for example, physically or oxidatively drying surface coatings, enamels, reaction surface coatings, two-component surface coatings, dispersion paints for weatherproof coatings and distempers. Printing inks are to be understood as those for printing on paper, textiles and tin plate. In particular, the new pigments are suitable for pigmentation of macromolecular organic substances.

The macromolecular substances can be of natural origin, such as caoutchouc, obtained by chemical modification, such as acetyl cellulose, cellulose butyrate or viscose, or produced synthetically, such as polymers, polyaddition products and polycondensates. Plastic compounds such as polyvinyl chloride, polyvinyl acetate, polyvinyl propionate, polyolefins, for example polyethylene or polyamides, superpolyamides, polymers and copolymers from acrylic esters or methacrylic esters, acrylonitrile, acrylamide, butadiene, styrene, as well as polyurethanes and polycarbonates. The substances which are pigmented with the claimed pigments can exist in any desired form. Because of their high transparency and weather fastness, the pigments of the formula I are particularly suited for use in automobile paints, particularly for metallic paint work.

The pigments of the formula I are extremely fast to water, oils, acids, lime, alkalis, solvents, overpainting, overspraying and sublimation, they are heat resistant, vulcanization resistant, have great covering power, can be easily dispersed in plastic compounds and are, in particular, extremely fast to light and migration.

EXAMPLE 1

26.2 g of 1-(cyano-phenylcarbamoyl-methylene)-3-hydrazonoisoindolenine and 26.5 g of 2-hydroxy-3-N-phenylcarbamoylnaphthalene-1-aldehyde are stirred in 280 ml of dimethylformamide for 1 hour at 100° C. and then treated with 22.6 g of nickel acetate.4H$_2$O. The mixture is then stirred for 3 hours at 120° C., the precipitating pigment filtered off with suction at 80° C. and washed with methanol. After drying, 49.8 g (91% of theory) of the chestnut pigment of the formula

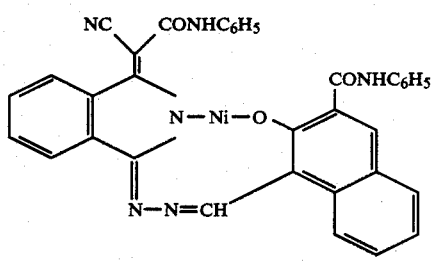

are obtained. Melting point >360° C.

$C_{35}H_{22}N_6O_3Ni$ (633.1) Calculated: C: 66.40, H: 3.47, N: 13.27, Ni: 9.27. Found: C: 66.3, H: 3.6, N: 13.1, Ni: 9.3.

If the procedure according to Example 1 is followed and the nickel acetate is replaced by a corresponding amount of one of the metal acetates listed in the table below, pigments with the colour tones given in the table are obtained.

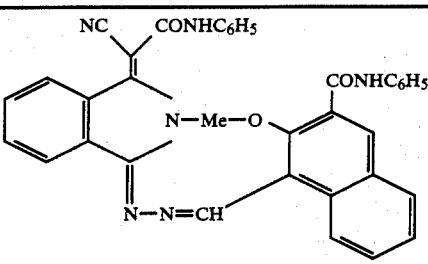

| Example | Me | Colour tone |
| --- | --- | --- |
| 2 | Cu$^{2+}$ | brown |
| 3 | Zn$^{2+}$ | red |
| 4 | Co$^{2+}$ | violet |

EXAMPLE 5

22.6 g of 1-(cyano-methylcarbamoyl-methylene)-3-imino-isoindolenine and 28.9 g of 2-hydroxy-3-N-phenylcarbamoylnaphthalene-1-aldehyde hydrazone are stirred in 300 ml of dimethylformamide for 1 hour at 100° C. and then treated with 25.0 g of nickel acetate.4H$_2$O within 15 minutes. The mixture is then stirred for 3 hours at 120° C., the precipitated pigment filtered off with suction at 80° C. and washed with methanol. After drying, 48.5 g (85% of theory) of the red pigment of the formula

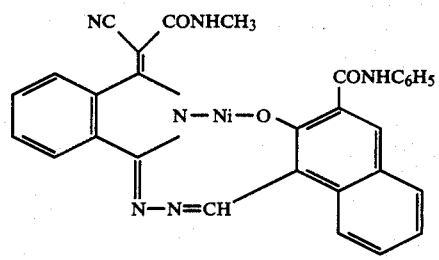

are thus obtained.

$C_{30}H_{20}N_6O_3Ni$ (571.01) Calculated: C: 63.10, H: 3.50, N: 14.71, Ni: 10.28. Found: C: 62.9, H: 3.7, N: 14.6, Ni: 10.3.

The pigments, with the indicated colour tones, which are listed in the table below are obtained on use of correspondingly varied 3-imino-isolenines according to the process mentioned in Example 5.

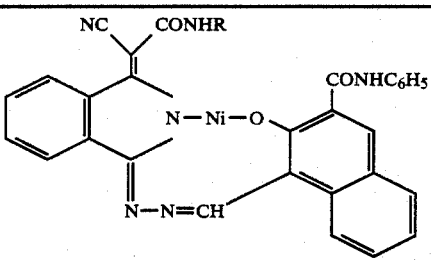

| Example | R | Colour tone |
| --- | --- | --- |
| 6 | C$_2$H$_5$ | Red |
| 7 | n-C$_3$H$_7$ | Red |
| 8 | CH$_2$C$_6$H$_5$ | Yellowish red |

-continued

[Structure: complex Ni complex with NC, CONHR, CONHC6H5 groups on naphthalene with N—Ni—O linkage and N—N=CH azo bridge]

| Example | R | Colour tone |
|---|---|---|
| 9 | 2-Cl-phenyl | Bluish red |
| 10 | 3-Cl-phenyl | Chestnut |
| 11 | 4-Cl-phenyl | Chestnut |
| 12 | 2,4-diCl-phenyl | Bluish red |
| 13 | 2,3-diCl-phenyl | Bluish red |
| 14 | 4-OCH₃-phenyl | Violet |
| 15 | 3-OCH₃-phenyl | Violet |
| 16 | 4-NO₂-phenyl | Brown |
| 17 | 3-CONH₂-4-Cl-phenyl | Red |

-continued

[Same Ni complex structure]

| Example | R | Colour tone |
|---|---|---|
| 18 | 3-CN-phenyl | Yellowish red |
| 19 | 3-CF₃-phenyl | Yellowish red |
| 20 | 2-(NHCO–)phenyl with N= | Bluish red |
| 21 | benzimidazol-2-yl | Black |

If the procedure according to Example 1 is followed and substituted aldehydes of β-oxynaphthoic acid anilide are used in corresponding amounts, the pigments, with the indicated colour tones, which are listed in the table below are obtained.

[Structure: Ni complex with NC, CONHC5H5, CONHAr groups]

| Example | Ar | Colour tone |
|---|---|---|
| 22 | 4-CH₃-phenyl | Red |
| 23 | 2,3-diCH₃-phenyl | Bluish red |

-continued

| Example | Ar | Colour tone |
|---|---|---|
| 24 | 1-naphthyl | Claret |
| 25 | 2,5-dimethoxy-4-chlorophenyl (H₃CO–, –Cl, –OCH₃) | Violet |
| 26 | 3-nitrophenyl (–NO₂) | Red |
| 27 | 4-methoxyphenyl (–OCH₃) | Red |
| 28 | 2-ethoxyphenyl (–OC₂H₅) | Bluish red |
| 29 | 4-acetylaminophenyl (–NHCOCH₃) | Bluish red |

EXAMPLE 30

(use example)

4 g of finely-ground pigment according to Example 1 are dispersed in 92 g of an enamel of the following composition:
33% alkyd resin
15% melamine resin
5% glycol monomethyl ether
34% xylene
13% butanol Suitable alkyd resins are products basd on synthetic and vegetable fatty acids such as coconut acid oil, castor oil, dehydrated castor oil and linseed oil inter alia. Urea resins can be used in place of melamine resins.

After dispersion, the pigmented surface coating is applied to paper sheets, glass sheets, plastic films or metal foils and stove-enamelled for 30 minutes at 130° C., a brilliant chestnut-coloured finish being obtained.

EXAMPLE 31

(use example)

6 parts of pigment according to Example 1 are dispersed in 12 parts of xylene, 4.1 parts of butyl acetate and 0.7 parts of n-butanol with 22.5 parts of a 20% strength solution of cellulose acetobutyrate in butyl acetate/xylene (2:1) for 30 minutes in Red Devil with 2-3 mm glass balls. After fattening up by addition of 10 parts of a saturated polyester resin (Dynapol H 700) 7.3 parts of melamine resin, 8.7 parts of a 20% strength solution of cellulose acetobutyrate in buty acetate/xylene (2:1), 18 parts of butyl acetate, 1.6-parts of n-butanol and 9.7 parts of xylene, the mixture is dispersed again for 5 minutes.

A dispersion of aluminium paste (60%) in an organic solvent (about 1:2) is added to this surface coating in an amount such that the pigment:Al ratio lies between 80:20 and 1:99.

This surface coating is applied and, after drying, coated with a varnish based on acrylate/melamine resin, which can contain further auxiliaries such as, for example, UV absorbers, and stove-enamelled.

A chestnut-coloured metallic coating with brilliant colouring and excellent weather-fastness is obtained.

EXAMPLE 32

0.2 g of the pigment obtained according to Example 1 is dispersed in 65 g of stabilized PVC and 35 g of diisooctyl phthalate at 160° C. in a roll mill and rolled out at 160° C. A chestnut-coloured film with very good light and migration fastness is obtained.

We claim:

1. A pigment of the formula

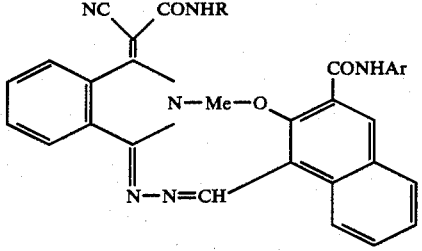

in which
Me=Zn, Cu, Co or Ni,
R=Alkyl, cycloalkyl, aralkyl, aryl or hetaryl, where the aryl or aralykyl radicals are optionally substituted by halogen, —NO₂, —CN, —CF₃, $C_1$-$C_4$-alkyl, $C_1$-$C_4$-alkoxy, carbamoyl, mono- and di-$C_1$-$C_4$-alkyl-carbamoly or $C_1$-$C_4$-alkylamino, or acetylamino,
Ar=aryl or aryl substituted by halogen, —NO₂, —CN, —CF₃, $C_1$-$C_4$-alkyl, $C_1$-$C_4$-alkoxy, carbamoyl, mono- and di-$C_1$-$C_4$-alkylcarbamoyl or $C_1$-$C_4$-alkylamino, or acetylamino.

2. A pigment, according to claim 1, in which
R=$C_1$-$C_6$-alkyl, $C_3$-$C_7$-cycloalkyl, phenyl- or naphthyl-$C_1$-$C_4$-alkyl, phenyl, naphthyl, where the aryl radicals are optionally substituted by halogen, —NO₂, —CN, —CF₃, $C_1$-$C_4$-alkyl, $C_1$-$C_4$-alkoxy, carbamoyl, mono- or di-$C_1$-$C_4$-alkyl-carbamoyl or $C_1$–$C_4$-alkylamino, benzimidazol-2-yl, benzthiazol-2-yl or 4-quinazolon-2-yl.

3. A pigment according to claim 1, in which Ar represents phenyl, α-naphthyl, 2-methylphenyl, 4-methylphenyl, 3-nitrophenyl, 2,5-dimethoxy-4-chlorophenyl, 2,5-dimethoxyphenyl, 4-chlorophenyl, 2,4-dimethoxy-5-chlorophenyl, 2-methyl-5-chlorophenyl, 2-methoxyphenyl, 2,4-dimethylphenyl, 2-ethoxyphenyl, 2-methyl-4-chlorophenyl or 4-acetylaminophenyl.

4. A pigment of the formula

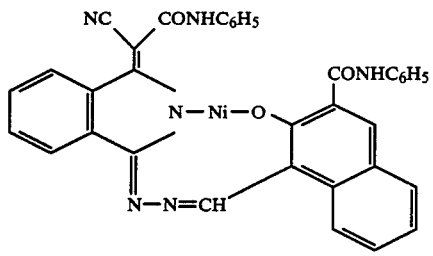

5. A pigment of the formula

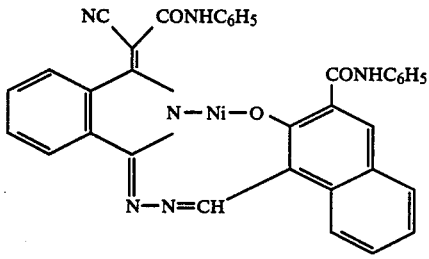

6. A pigment of the formula

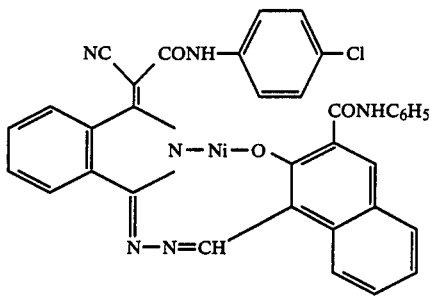

7. A pigment of the formula

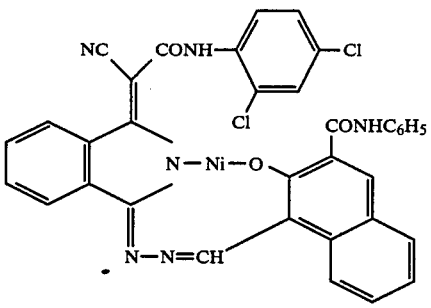

8. A pigment of the formula

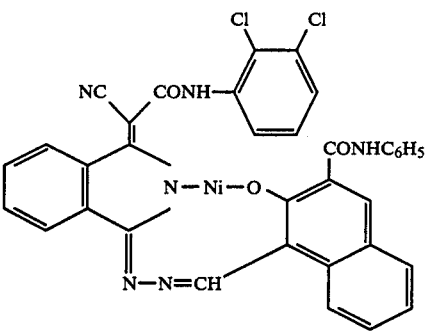

9. A process for the pigmentation of macromolecular organic substances, wherein pigments according to claim 1 are used.

10. A process for the pigmentation of automotive paints, wherein pigments according to claim 1 are used.

* * * * *